United States Patent
Nash

(10) Patent No.: US 8,495,522 B2
(45) Date of Patent: Jul. 23, 2013

(54) NAVIGATION IN A DISPLAY

(75) Inventor: Ian Nash, Berkshire (GB)

(73) Assignee: Nokia Corporation, Espoo (FI)

( * ) Notice: Subject to any disclaimer, the term of this patent is extended or adjusted under 35 U.S.C. 154(b) by 304 days.

(21) Appl. No.: 12/906,429

(22) Filed: Oct. 18, 2010

(65) Prior Publication Data
US 2012/0096411 A1    Apr. 19, 2012

(51) Int. Cl.
*G06F 3/033* (2006.01)
*G06F 3/048* (2006.01)

(52) U.S. Cl.
USPC ............ 715/863; 715/764; 715/778; 715/788

(58) Field of Classification Search
USPC .................................. 715/863, 764, 778, 788
See application file for complete search history.

(56) References Cited

U.S. PATENT DOCUMENTS

| 5,872,555 | A  | * | 2/1999  | Kolar et al.    | 345/594 |
| 2006/0038796 | A1 | * | 2/2006  | Hinckley et al. | 345/173 |
| 2010/0199306 | A1 | * | 8/2010  | Colter et al.   | 725/38  |
| 2010/0302188 | A1 | * | 12/2010 | Bamford et al.  | 345/173 |
| 2011/0107259 | A1 | * | 5/2011  | Haugh et al.    | 715/810 |
| 2013/0051752 | A1 | * | 2/2013  | Allen et al.    | 386/234 |

OTHER PUBLICATIONS

Logitech, diNovo Mini, User's Guide, 4 pgs, 2008.

* cited by examiner

*Primary Examiner* — David Phantana Angkool
(74) *Attorney, Agent, or Firm* — Harrington & Smith

(57) ABSTRACT

An apparatus including a controller configured to switch a continuous navigation mode to a discontinuous navigation mode in response to a predefined discontinuous navigation input and configured to switch a discontinuous navigation mode to a continuous navigation mode in response to a predefined continuous navigation input.

22 Claims, 3 Drawing Sheets

Figure 1:
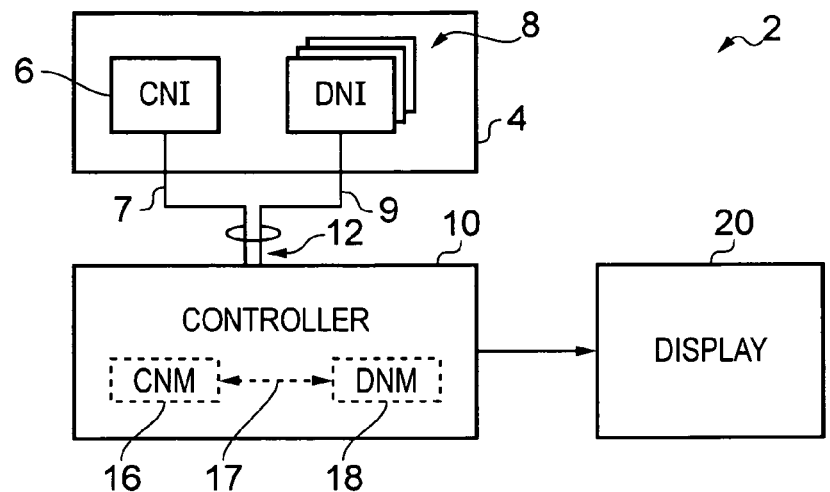

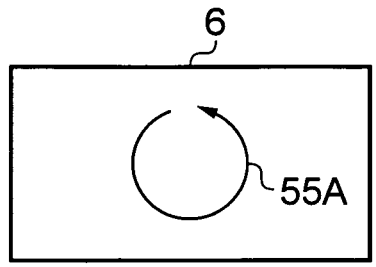
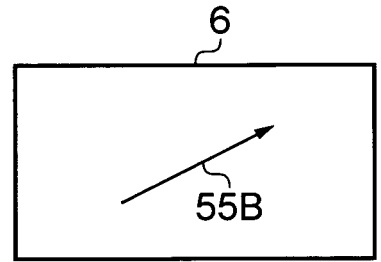
FIG. 5A          FIG. 5B
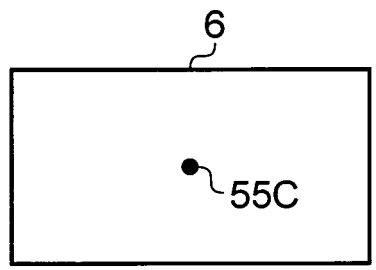
FIG. 5C
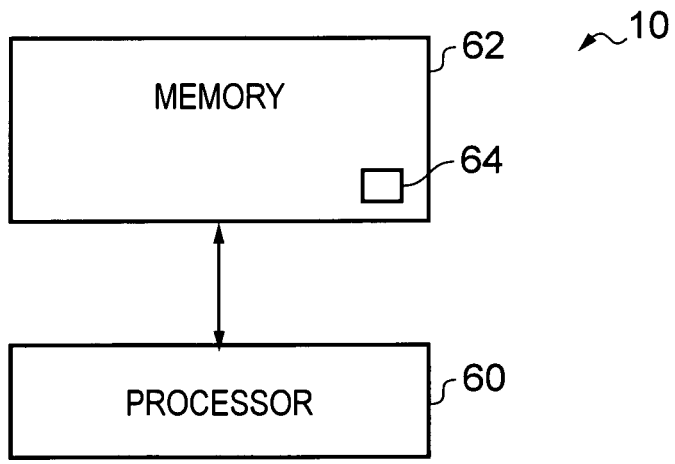
FIG. 6
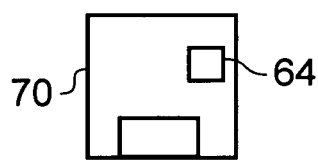
FIG. 7

NAVIGATION IN A DISPLAY

TECHNOLOGICAL FIELD

Embodiments of the present invention relate to navigation in a display.

BACKGROUND

When a user is using, for example, a lap top computer, there are generally different ways of controlling a position of an indictor in a display.

For example, arrow keys may be used for discontinuous navigation in which the indicator is moved discretely between separated display areas.

For example, a roller ball, touch screen or mini-joystick may be used for continuous navigation in which an indicator is moved freely in the display.

It may be desirable to provide for both discontinuous navigation and continuous navigation but in a different way.

BRIEF SUMMARY

According to various, but not necessarily all, embodiments of the invention there is provided an apparatus comprising: a controller configured to switch a continuous navigation mode to a discontinuous navigation mode in response to a predefined discontinuous navigation input and configured to switch a discontinuous navigation mode to a continuous navigation mode in response to a predefined continuous navigation input.

A predefined continuous navigation input may comprise one or more predefined actuations of a continuous navigation input device over a period of time and a predefined discontinuous navigation input may comprise actuation of any one of a plurality of discrete discontinuous navigation input devices, that are operationally distinct from the continuous navigation input device.

According to various, but not necessarily all, embodiments of the invention there is provided a method comprising: detecting at an apparatus, when the apparatus is in a continuous navigation mode, a predefined discontinuous navigation input; in response to detecting the predefined discontinuous navigation input, switching the apparatus from the continuous navigation mode to a discontinuous navigation mode; detecting at the apparatus, when the apparatus is in a discontinuous navigation mode, a predefined continuous navigation input; in response to detecting the predefined continuous navigation input, switching the apparatus from the discontinuous navigation mode to the continuous navigation mode.

According to various, but not necessarily all, embodiments of the invention there is provided an apparatus comprising: at least one processor; and at least one memory including computer program code the at least one memory and the computer program code configured to, with the at least one processor, cause the apparatus at least to switch a continuous navigation mode to a discontinuous navigation mode in response to a predefined discontinuous navigation input and configured to switch a discontinuous navigation mode to a continuous navigation mode in response to a predefined continuous navigation input.

According to various, but not necessarily all, embodiments of the invention there is provided an apparatus comprising: a central continuous navigation input device defining an input area having a periphery; and a peripheral arrangement of discontinuous navigation input devices comprising a plurality of discrete discontinuous navigation input devices arranged at the periphery of the input area of the central continuous navigation input.

According to various, but not necessarily all, embodiments of the invention there is provided an apparatus comprising: a continuous navigation input device defining an input area; and a plurality of discrete discontinuous navigation input devices at least some of which are, at least partially, positioned under the input area of the continuous navigation input.

Embodiments may minimize discrete hardware inputs required to provide discontinuous navigation mode and continuous navigation mode on portable small screened devices (or where product size is an issue)

BRIEF DESCRIPTION

Figure 2A:
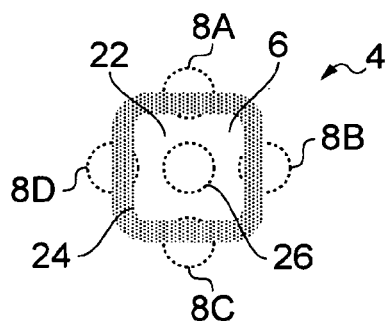
Figure 2B:
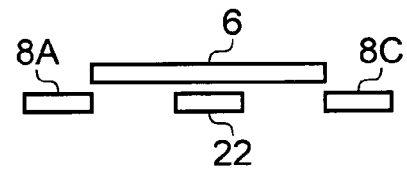
Figure 3A:
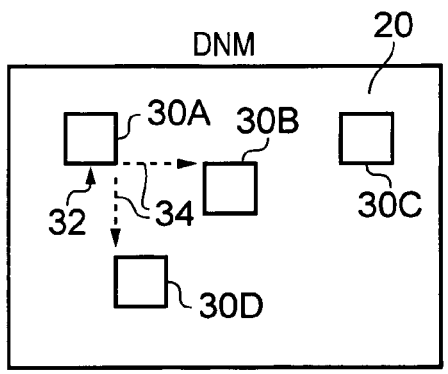
Figure 3B:
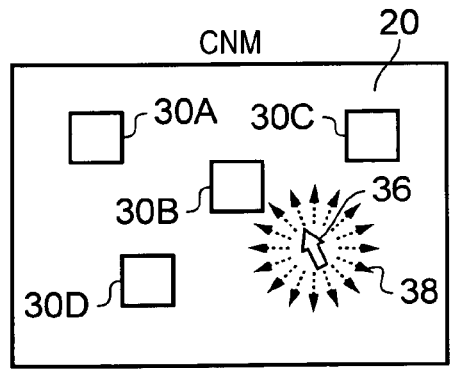
Figure 4:
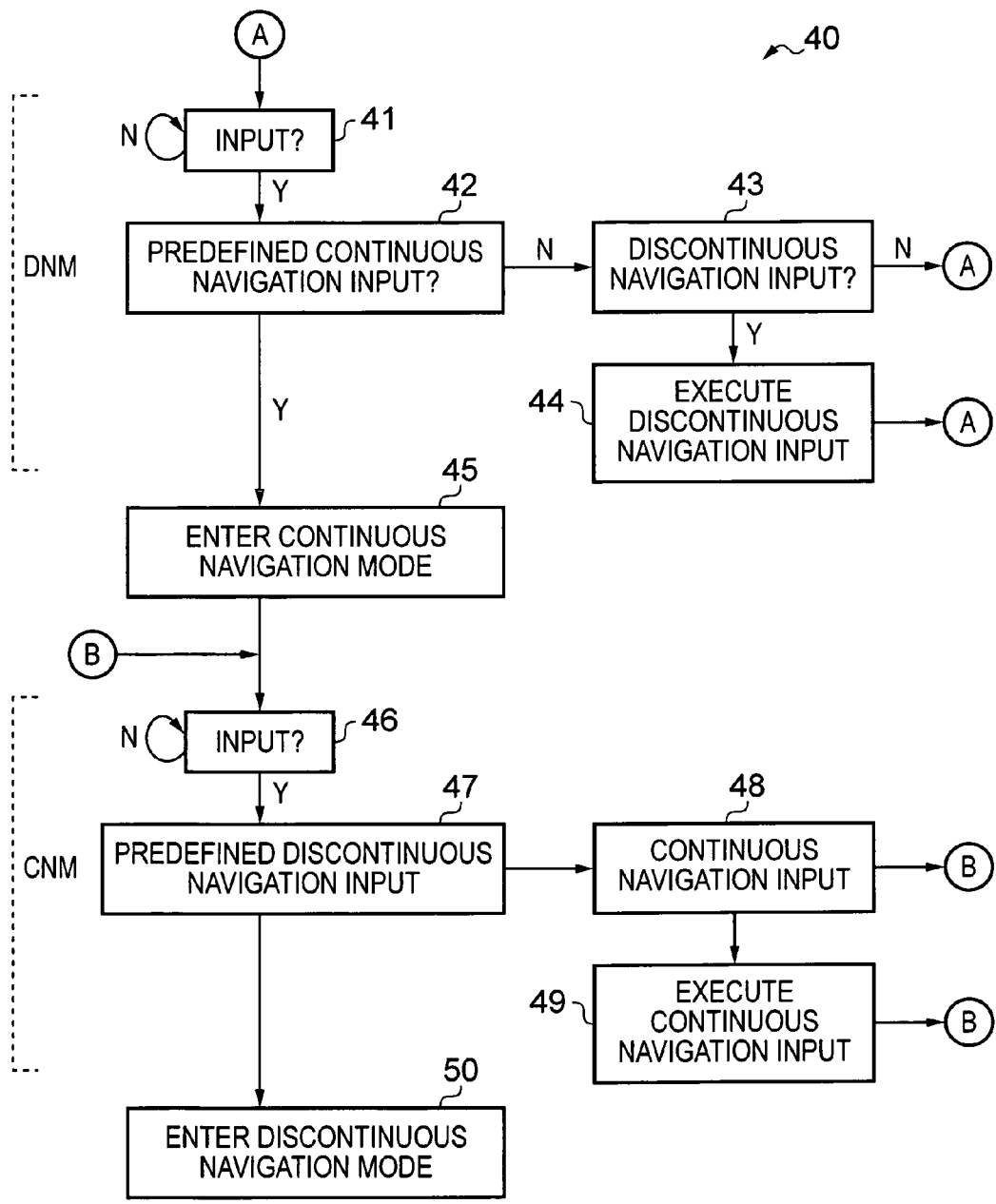

For a better understanding of various examples of embodiments of the present invention reference will now be made by way of example only to the accompanying drawings in which:

FIG. 1 schematically illustrates an apparatus comprising a controller 10 configured to switch between a continuous navigation mode (CNM) and a discontinuous navigation mode (DNM);

FIG. 2A schematically illustrates an example of a user input interface in plan view;

FIG. 2B schematically illustrates an example of a user input interface in cross-sectional view;

FIG. 3A schematically illustrates discontinuous navigation;

FIG. 3B schematically illustrates continuous navigation;

FIG. 4 schematically illustrates a method;

FIGS. 5A, 5B and 5C schematically illustrate examples of potentially valid predefined continuous navigation inputs;

FIG. 6 schematically illustrates an example of a controller; and

FIG. 7 schematically illustrates a data carrier.

DETAILED DESCRIPTION

FIG. 1 schematically illustrates an apparatus 2 comprising: a controller 10 configured to switch a continuous navigation mode (CNM) to a discontinuous navigation mode (DNM) in response to a predefined discontinuous navigation input 9 and configured to switch a discontinuous navigation mode to a continuous navigation mode in response to a predefined continuous navigation input 7.

In some implementations, the apparatus may, for example, be a personal device that is primarily used by a single user such as personal music player, a mobile cellular telephone, a lap-top computer etc.

In some implementations, the apparatus may, for example, be portable. It may, for example, be a hand-portable apparatus, that is sized to fit in the palm of the hand or a jacket pocket.

In this document 'navigation' refers to the user control of a position of an indicator on a display.

Navigation may be discontinuous navigation in which the indicator moves discretely between separated display areas. The indicator is displayed in the 'permitted' separated display areas without being displayed in 'forbidden' intermediate areas between the separated display areas. The indicator appears to a user to hop or jump when it moves as there is only a reduced set of isolated positions that the indicator can occupy on the display. For this reason, discontinuous navigation may also be called focused navigation. This reduced set of positions is typically orders of magnitude smaller than the number of pixels on the display. The positions may also be arbitrarily, rather than regularly, distributed in the display, for example, to correspond to the position of selectable items on the display. Thus, for example, if the position of the indicator is (x,y) then both x and y are orthogonal but discontinuous variables.

Navigation may be continuous navigation in which the indicator moves freely in the display. The indicator can be located by a user at a position of the user's choice. There are no 'forbidden' areas within the active display area. The indicator appears to glide rather than hop or jump when it moves. For this reason, continuous navigation may also be called pointer navigation. Each position that the indicator can occupy may correspond to a pixel of the display or a small group of pixels (e.g. four pixels). These positions may be regularly distributed in the display as a dense rectangular array. Thus, for example, if the position of the indicator is (x,y) then both x and y are orthogonal but analog variables.

An indicator may, for example, be a cursor such as, for example, a text insertion point. Such an indictor may be moved using discontinuous navigation as there are a limited number of valid insertion points.

As schematically illustrated in FIG. 3A, an indicator may, for example, be a highlight 32 that is moved from display item 30A-30D to display item 30A-30D using discontinuous navigation as there will be a limited number of display items 30A-30D. The highlight 32 may, for example, indicate which display item is currently selected or selectable by a user. In FIG. 3A, which illustrates the discontinuous navigation mode, the display item 30A is highlighted by highlight indicator 32. The highlight indicator 32 may be moved right to highlight display item 30B or may be moved down to highlight display item 30D. The movement 34 of the highlight indicator 32 is therefore constrained at this time to a jump right or a jump down.

As schematically illustrated in FIG. 3B, an indicator may, for example, be a movable icon 36 such as, for example, an arrow or other pointer. Such an indicator 36 may be moved using continuous navigation as there will typically not be any constraint or limitation of where the indicator can be positioned. In FIG. 3B, which illustrates the continuous navigation mode, the movement 38 of the pointer indicator 32 is unconstrained and can be in any 360 degree direction irrespective of the layout of the display items 30A-30D.

Referring back to FIG. 1, the Figure schematically illustrates an apparatus 2 comprising a controller 10, a user input interface 4 and a display 20.

The controller 10 is configured to receive via an interface 12 input signals 7, 9 from the user input interface 4.

The controller 10 is configured to control switching 17 between a continuous navigation mode (CNM) 16 and a discontinuous navigation mode (DNM) 18. The switching decision is based upon the received input signals 7, 9.

In this example, the controller 10 is also configured to control the display 20. However, in other examples the control of the display 20 may be carried out by another entity and, in this example, the controller 10 may enable control of the display 20. Therefore in this example, the controller 10 may be a single entity that controls mode switching and controls the display or may be a collection of entities that together perform those functions.

The controller 10 is operationally coupled to the user input interface 4 and the display 20 and any number or combination of intervening elements can exist (including no intervening elements)

In this example, the user input interface 4 comprises a continuous navigation input device 6 and one or more distinct discontinuous navigation input devices.

A continuous navigation input and a discontinuous navigation input may, for example, be distinguished by the identity of the device they originate from.

However, in other examples, a common user input device may be used as both a continuous navigation input device 6 and a discontinuous navigation input device 8. A continuous navigation input and a discontinuous navigation input may, in this example, be distinguished using the current mode of the device and/or the form or format of the input.

In this illustrated example, the continuous navigation input device 6 is configured to control a position of an indicator on the display 20 when the apparatus is in a continuous navigation mode (CNM).

In this illustrated example, a plurality of discrete discontinuous navigation input devices 8 are configured to control a position of an indicator on the display when the apparatus is in a discontinuous navigation mode (DNM).

The controller 10 is configured to switch a continuous navigation mode (CNM) to a discontinuous navigation mode (DNM) in response to a predefined discontinuous navigation input 9 from the discontinuous navigation input device 8 and configured to switch a discontinuous navigation mode to a continuous navigation mode in response to a predefined continuous navigation input 7 from the continuous navigation input devices 6.

The predefined discontinuous navigation input that switches modes may comprises actuation of any one of the plurality of discontinuous navigation input devices 8.

The predefined continuous navigation input that switches modes may comprise one or more predefined actuations of the continuous navigation input device 6 over a period of time.

FIG. 2A schematically illustrates an example of a user input interface 4 that comprises a centrally located continuous navigation input device 6 defining an input area 22 having a circumscribing periphery 24 and a plurality of discrete discontinuous navigation input devices 8A, 8B, 8C, 8D that are arranged at the periphery 24 of the input area 22 of the central continuous navigation input 6. There are, in this example, four discrete discontinuous navigation input devices 8A, 8B, 8C, 8D positioned with 90 degrees separation around the periphery 24. The discrete discontinuous navigation input devices 8A, 8B, 8C, 8D are respectively for up, right, down, left discrete movement. This provides 4-way directional control.

The discrete discontinuous navigation input devices 8A, 8B, 8C, 8D may each be pressure activated switches such as key pad dome switches or similar.

As illustrated in FIG. 2B, the discrete discontinuous navigation input devices 8A, 8B, 8C, 8D are, in this example, at least partially, positioned under the input area 22 of the continuous navigation input 6. In other embodiments, the discrete discontinuous navigation input devices 8A, 8B, 8C, 8D may be positioned wholly under the input area 22 of the continuous navigation input 6. In still other embodiments, the discrete discontinuous navigation input devices 8A, 8B, 8C, 8D may be positioned wholly outside the input area 22 of the continuous navigation input 6.

The continuous navigation input device 6 may be a gesture detector that for example uses optical sensors or touch sensors.

The continuous navigation input device 6 may, for example, be a touch sensitive screen that detects contact or near contact with the screen.

The continuous navigation input device 6 may, for example, be a finger print detector which uses optical sensors to locate a finger position over the input area 22.

In this example, the user input interface 4 has a discrete input device 26 that is common to the discrete discontinuous navigation mode and the continuous navigation mode.

The discrete input device 26 may have the same common purpose in both modes e.g. selection.

The discrete input device 26 is positioned centrally underneath the input area 22 of the continuous navigation input 6.

FIG. 4 schematically illustrates a method comprising: detecting 42 at the apparatus 2, when the apparatus 2 is in a discontinuous navigation mode (DNM), a predefined continuous navigation input; in response to detecting the predefined continuous navigation input, switching 45 the apparatus from the discontinuous navigation mode (DNM) to the continuous navigation mode (CNM); detecting 47 at the apparatus 2, when the apparatus 2 is in a continuous navigation mode (CNM), a predefined discontinuous navigation input; and in response to detecting the predefined discontinuous navigation input, switching 50 the apparatus 2 from the continuous navigation mode (CNM) to a discontinuous navigation mode (DNM)

Referring to FIG. 4 in detail, the method 40 comprises a series of blocks.

At block 41 it is determined whether or not the controller 10 has received an input via interface 12. If it has, the method moves to block 42. If it hasn't the method returns to block 41.

At block 42 it is determined whether or not the input received is a predefined continuous navigation input. If the input is both a continuous navigation input and satisfies an additional predefined constraint then the method moves to block 45. If the input is either a discontinuous navigation input or a continuous navigation input that does not satisfy the additional predefined constraint then the method moves to block 43. The requirement that the input satisfy the additional predefined constraint, prevents accidental switching of modes.

At block 43, it is determined whether or not the input received is a discontinuous navigation input. If the input is a discontinuous navigation input, the method moves to block 44 and if not the method returns to block 41.

At block 44, the received discontinuous navigation input is executed as a navigation command and an indicator on the display 20 is moved discretely. The method then returns to block 41.

At block 45, the controller 10 switches 17 the discontinuous navigation mode (DNM) 18 to the continuous navigation mode (CNM) 16 in response to the predefined continuous navigation input detected at block 42. The method then moves to block 46.

At block 46 it is determined whether or not the controller 10 has received an input via interface 12. If it has, the method moves to block 47. If it hasn't the method returns to block 46.

At block 47 it is determined whether or not the input received is a predefined discontinuous navigation input. If the input is both a discontinuous navigation input and satisfies an additional predefined constraint then the method moves to block 50. If the input is either a continuous navigation input or a discontinuous navigation input that does not satisfy the additional predefined constraint then the method moves to block 48. The requirement that the input satisfy the additional predefined constraint, prevents accidental switching of modes.

At block 48, it is determined whether or not the input received is a continuous navigation input. If the input is a continuous navigation input, the method moves to block 49 and if not the method returns to block 46.

At block 49, the received continuous navigation input is executed as a navigation command and an indicator on the display 20 is moved. The method then returns to block 46.

At block 50, the controller 10 switches 17 the continuous navigation mode (CNM) 16 to the discontinuous navigation mode (DNM) 18 in response to the predefined discontinuous navigation input detected at block 47. The method then moves to block 41.

In this example, the controller 10 receives via the interface 12 input signals that are interpretable as either continuous navigation inputs or discontinuous navigation inputs. When the apparatus is in the continuous navigation mode, the controller 10 interprets the received input signals as continuous navigation inputs (except if the input signals can be interpreted as the predefined discontinuous navigation input that switches modes). When the apparatus is in the discontinuous navigation mode, the controller 10 interprets the received input signals as discontinuous navigation inputs (except if the input signals can be interpreted as the predefined continuous navigation input that switches modes).

The continuous navigation input device 6 is, in this example, ineffective at controlling a position of an indicator on the display 20 when the apparatus is in a discontinuous navigation mode. However, it can be used to switch modes.

The discontinuous navigation input device 8 is, in this example, ineffective at controlling a position of an indicator on the display 20 when the apparatus is in a discontinuous navigation mode. However, it can be used to switch modes.

FIGS. 5A, 5B and 5C schematically illustrate examples of potentially valid predefined continuous navigation inputs. Each figure illustrates a predefined continuous navigation input that comprises one or more predefined actuations of a continuous navigation input device 6 over a period of time (a gesture).

In FIGS. 5A and 5B, the gesture is a trace that has defined characteristics.

In FIG. 5A, for example, the predefined constraints may be that the acceleration of the point of contact forming the closed loop trace has a substantially constant value and a continually changing direction. The location of the trace may or may not be an additional predefined constraint.

In FIG. 5B, for example, the predefined constraints may be that the linear velocity or acceleration of the point of contact forming the trace has a particular characteristic. The location of the trace may or may not be an additional predefined constraint.

In FIG. 5C, for example, the predefined constraints may be that the point of contact remains stationary for a defined period. The location of the trace may or may not be an additional predefined constraint.

It will be understood that many different gestures may be defined to switch modes. Preferably the gestures have characteristics that make it unlikely that they are accidentally produced in the discontinuous navigation mode.

The display 20 may also be an input device, for example, it may be a touch sensitive display. In this case it may be desirable to enable touch input via the display irrespective of the current navigational mode.

If the display is a touch sensitive display that allows continuous navigation by touch, then the commands used to enable touch navigation can be reused to enable continuous navigation using the continuous navigation input device 6. However, in touch navigation it is not necessary to generate a pointer indicator on the display 20.

If touch navigation is available then the default mode may be touch navigation.

The controller 10 may be configured to switch to a discontinuous navigation mode (from a continuous navigation mode or a touch navigation only mode) in response to a predefined discontinuous navigation input.

The controller 10 may be configured to switch to a continuous navigation mode (from a discontinuous navigation mode or a touch navigation only mode) in response to a predefined continuous navigation input.

The continuous navigation mode may, in the absence of continuous navigation inputs, time-out and re-enter the touch navigation only mode.

The discontinuous navigation mode may, in the absence of discontinuous navigation inputs, time-out and re-enter the touch navigation only mode.

Implementation of controller 10 can be in hardware alone (a circuit, a processor . . . ), have certain aspects in software including firmware alone or can be a combination of hardware and software (including firmware).

The controller 10 may be implemented using instructions that enable hardware functionality, for example, by using executable computer program instructions in a general-purpose or special-purpose processor that may be stored on a computer readable storage medium (disk, memory etc) to be executed by such a processor.

Referring to FIG. 6, a processor 60 is configured to read from and write to the memory 62. The processor 60 may also comprise an output interface via which data and/or commands are output by the processor and an input interface via which data and/or commands are input to the processor 60.

The memory 62 stores a computer program 64 comprising computer program instructions that control the operation of the apparatus 2 when loaded into the processor 60. The computer program instructions 64 provide the logic and routines that enables the apparatus to perform the methods illustrated in FIG. 4. The processor 60 by reading the memory 62 is able to load and execute the computer program 64.

The apparatus 2 may therefore comprise: at least one processor; and at least one memory including computer program code the at least one memory and the computer program code configured to, with the at least one processor, cause the apparatus at least to switch a continuous navigation mode to a discontinuous navigation mode in response to a predefined discontinuous navigation input and configured to switch a discontinuous navigation mode to a continuous navigation mode in response to a predefined continuous navigation input.

The computer program may arrive at the apparatus 2 via any suitable delivery mechanism 70. The delivery mechanism 70 may be, for example, a computer-readable storage medium, a computer program product, a memory device, a record medium such as a compact disc read-only memory (CD-ROM) or digital versatile disc (DVD), an article of manufacture that tangibly embodies the computer program 64. The delivery mechanism may be a signal configured to reliably transfer the computer program 64. The apparatus 2 may propagate or transmit the computer program as a computer data signal.

Although the memory 62 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single /multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The controller 10 may be a module. The user input interface 4 may be a module.

The blocks illustrated in FIG. 4 may represent steps in a method and/or sections of code in the computer program 64. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a controller coupled with a display screen comprised of an array of display pixels arranged along x and y axes of the display screen, the controller configured to switch a continuous navigation mode of a display screen indicator to a discontinuous navigation mode in response to a predefined discontinuous navigation input and configured to switch a discontinuous navigation mode of the display screen indicator to a continuous navigation mode in response to a predefined continuous navigation input, where
   in the continuous navigation mode the display screen indicator is unconstrained so as to move between display pixels located at any x axis and y axis coordinate locations of the display screen, and where in the discontinuous navigation mode the display screen indicator is constrained so as to move between display pixels located only at certain predetermined x axis and y axis coordinate locations of the display screen, where the certain predetermined x axis and y axis coordinate locations are less than all possible x axis and y axis coordinate locations.

2. An apparatus as claimed in claim 1, wherein, in the continuous navigation mode received input signals that are interpretable as either continuous navigation inputs or discontinuous navigation inputs are interpreted as continuous navigation inputs.

3. An apparatus as claimed in claim 1, wherein, in the discontinuous navigation mode received input signals that interpretable as either continuous navigation inputs or discontinuous navigation inputs are interpreted as discontinuous navigation inputs.

4. An apparatus as claimed in claim 1, wherein a predefined continuous navigation input comprises one or more predefined actuations of a continuous navigation input device over a period of time.

5. An apparatus as claimed in claim 1, wherein a predefined continuous navigation input comprises a gesture.

6. An apparatus as claimed in claim 1, wherein a predefined discontinuous navigation input comprises actuation of any one of a plurality of discrete discontinuous navigation input devices.

7. An apparatus as claimed in claim 1, wherein the discontinuous navigation mode and the continuous navigation mode share a common selection device.

8. An apparatus as claimed in claim 7, wherein the common selection device is located underneath a continuous navigation input device.

9. An apparatus as claimed in claim 1, further comprising:
   a continuous navigation input device configured to control a position of the display screen indicator on the display screen when the apparatus is in the continuous navigation mode; and
   a plurality of discrete discontinuous navigation input devices configured to control a position of the display screen indicator on the display screen when the apparatus is in the discontinuous navigation mode.

10. An apparatus as claimed in claim 9, wherein the continuous navigation input device is ineffective at controlling a position of the display screen indicator on the display screen when the apparatus is in the discontinuous navigation mode.

11. An apparatus as claimed in claim 9, wherein the discontinuous navigation input is ineffective at controlling a position of the display screen indicator on the display screen when the apparatus is in the discontinuous navigation mode.

12. An apparatus as claimed in claim 9, wherein the continuous navigation input device comprises an optical sensor.

13. An apparatus as claimed in claim 9, wherein the continuous navigation input device is a gesture detector.

14. An apparatus as claimed in claim 9, wherein the continuous navigation input device comprises a touch sensitive area.

15. An apparatus as claimed in claim 9, wherein the plurality of discrete discontinuous navigation input devices are configured for four-way directional control.

16. An apparatus as claimed in claim 8, wherein the continuous navigation input device is a central continuous navigation input device defining an input area having a periphery; and the plurality of discrete discontinuous navigation input devices are arranged at the periphery of the input area of the central continuous navigation input device.

17. An apparatus as claimed in claim 8, wherein the continuous navigation input device comprises an input area and at least some of the plurality of discrete discontinuous navigation input devices are, at least partially, positioned under the input area of the continuous navigation input device.

18. An apparatus as claimed in claim 8, wherein a discrete input device that is used for selection in the discontinuous navigation mode and the continuous navigation mode is positioned centrally under the input area of the continuous navigation input.

19. A method comprising:
   detecting at an apparatus comprising a display screen comprised of an array of display pixels arranged along x and y axes of the display screen, when the apparatus is in a continuous navigation mode of a display screen indicator, a predefined discontinuous navigation input;
   in response to detecting the predefined discontinuous navigation input, switching the apparatus from the continuous navigation mode to a discontinuous navigation mode of the display screen indicator;
   detecting at the apparatus, when the apparatus is in a discontinuous navigation mode, a predefined continuous navigation input;
   in response to detecting the predefined continuous navigation input, switching the apparatus from the discontinuous navigation mode to the continuous navigation mode, where in the continuous navigation mode the display screen indicator is unconstrained so as to move between display pixels located at any x axis and y axis coordinate locations of the display screen, and where in the discontinuous navigation mode the display screen indicator is constrained so as to move between display pixels located only at certain predetermined x axis and y axis coordinate locations of the display screen, where the certain predetermined x axis and y axis coordinate locations are less than all possible x axis and y axis coordinate locations.

20. A method as claimed in claim 19, wherein,
   receiving input signals from one or more input devices that are interpretable as either continuous navigation inputs or discontinuous navigation inputs
   when the apparatus is in the continuous navigation mode, interpreting the received input signals as continuous navigation inputs.

21. A method as claimed in claim 19, wherein,
   receiving input signals from one or more input devices that are interpretable as either continuous navigation inputs or discontinuous navigation inputs when the apparatus is in the discontinuous navigation mode, interpreting the received input signals as discontinuous navigation inputs.

22. An apparatus comprising:

a display screen comprised of an array of pixels arranged along x and y axes of the display screen;

at least one processor; and at least one memory including computer program code the at least one memory and the computer program code configured to, with the at least one processor, cause the apparatus at least to switch a continuous navigation mode of a display screen indicator to a discontinuous navigation mode of the display screen indicator in response to a predefined discontinuous navigation input and configured to switch a discontinuous navigation mode to a continuous navigation mode in response to a predefined continuous navigation input, where in the continuous navigation mode the display screen indicator is unconstrained so as to move between display pixels located at any x axis and y axis coordinate locations of the display screen, and where in the discontinuous navigation mode the display screen indicator is constrained so as to move between display pixels located only at certain predetermined x axis and y axis coordinate locations of the display screen, where the certain predetermined x axis and y axis coordinate locations are less than all possible x axis and y axis coordinate locations.

* * * * *

UNITED STATES PATENT AND TRADEMARK OFFICE
CERTIFICATE OF CORRECTION

PATENT NO.        : 8,495,522 B2
APPLICATION NO.   : 12/906429
DATED             : July 23, 2013
INVENTOR(S)       : Ian Nash Page 1 of 1

It is certified that error appears in the above-identified patent and that said Letters Patent is hereby corrected as shown below:

In the Claims

In Claim 22:
Column 11, line 5, "of pixels" should be deleted and --of display pixels-- should be inserted.

Signed and Sealed this
Twenty-fourth Day of September, 2013

Teresa Stanek Rea
*Deputy Director of the United States Patent and Trademark Office*